United States Patent Office 2,956,299
Patented Oct. 18, 1960

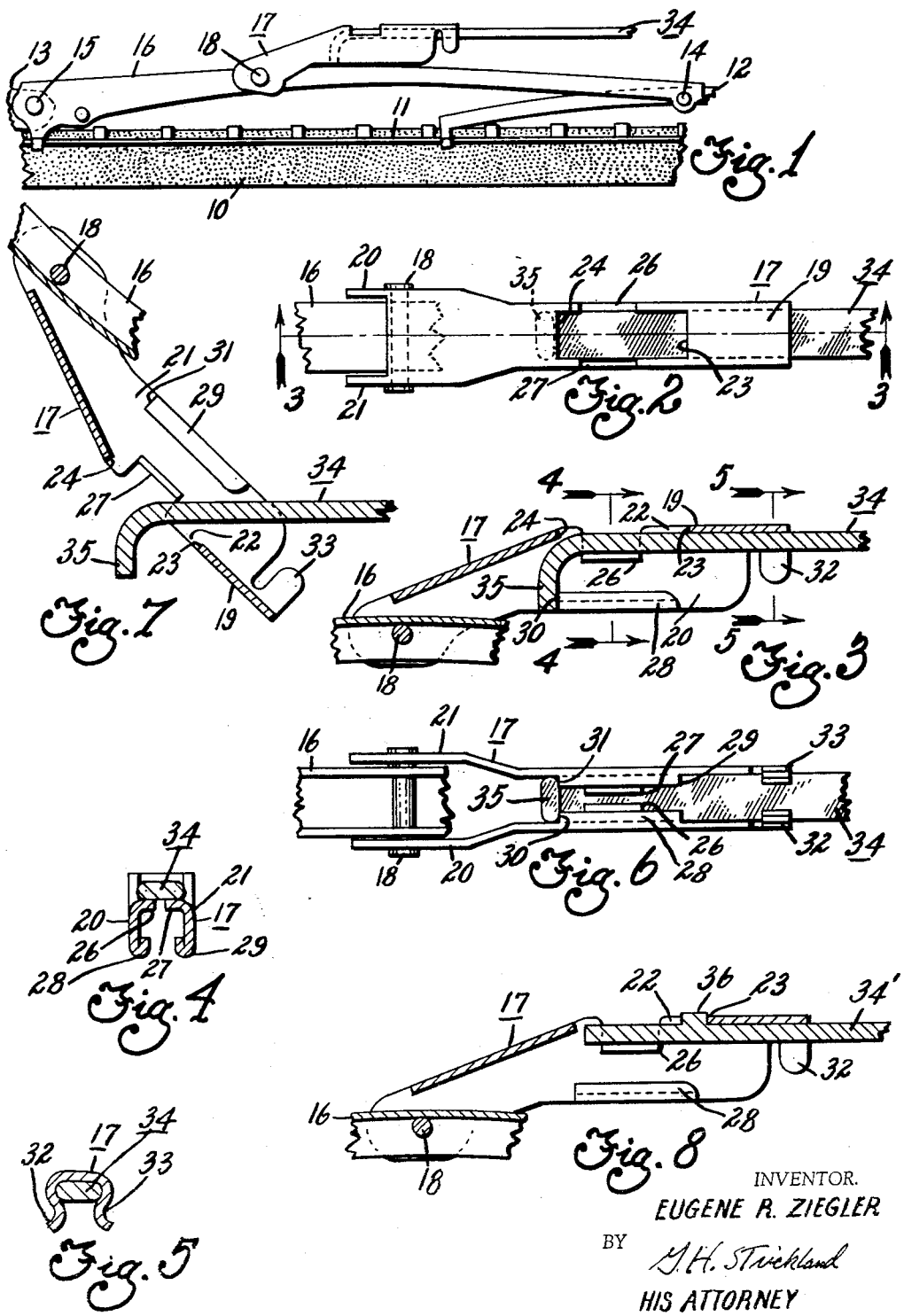

2,956,299

CONNECTOR FOR WINDSHIELD WIPER BLADE

Eugene R. Ziegler, Spencerport, N.Y., assignor to General Motors Corporation, Detroit, Mich., a corporation of Delaware Filed June 7, 1957, Ser. No. 664,279

5 Claims. (Cl. 15—250.32)

This invention pertains to windshield cleaners, and particularly to a connector on a wiper blade for attachment to a wiper arm.

At the present time, straight end wiper arms are being used on some windshield cleaners to minimize the twisting, or rotating, movement between the blade connector and the arm and thus prevent contact between the metal parts of the blade assembly and the glass. The present invention relates to a connector which can be used interchangeably with a straight end arm and a hooked end arm for detachably connecting a wiper arm and a wiper blade while maintaining the arm and blade in proper alignment at all times. Moreover, the connector is designed to prevent twisting movement between the arm and blade connector due to the forces imposed thereon during wiping when used with either a hooked end arm or a straight end arm. Accordingly, among my objects are the provision of an improved connector for detachably connecting a wiper blade and a wiper arm; the further provision of a connector capable of attachment to a straight end arm or a hooked end arm; and the still further provision of a connector including means for preventing disengagement of the wiper arm and the wiper blade due to forces imposed thereon during wiping.

The aforementioned and other objects are accomplished in the present invention by embodying an integral spring clip in the connector in combination with means preventing relative tilting movement between the connector and the arm. Specifically, the connector is particularly adaptable for use with a flexible wiper blade assembly including a pressure distributing linkage comprising a holder and a plurality of secondary pressure distributing members pivotally connected to the holder and connected to a flexible squeegee unit at longitudinally spaced points. The connector comprises an inverted channel-shaped member pivotally attached to the holder on an axis extending transversely of the blade. The channel-shaped member has a slot in the top wall thereof with a pair of inwardly extending abutments disposed in a plane parallel to and beneath the top wall. In addition, portions of the side walls are folded over to form a pair of abutments located in a plane parallel to but spaced from the first pair of abutments. The side walls of the channeled member at the end remote from its pivotal connection with the wiper blade are slotted and the ears formed by the slots are deformed to constitute spring clips.

The connector is specifically designed to receive a wiper arm having a hooked end, that is, the wiper arm has an end portion located at substantially right angles to the main portion of the outer arm section and extending towards the surface to be wiped. The arm is attached to the connector by inverting the blade assembly and inserting the hooked end of the arm through the slot in the top wall of the connector. The blade assembly is then rotated about its longitudinal axis throughout 180° to position the hooked end of the arm between the top wall of the connector and the upper abutments. Thereafter, the blade assembly is rotated about an axis normal to the longitudinal axis of the arm to a position where the spring clips on the connector engage the arm to lock the arm in position with the hooked end of the arm engaging the ends of the lower abutments and the straight portion of the arm engaging the upper surface of the upper abutments.

As alluded to hereinbefore, the connector can also be used with a straight end arm having a raised nub located inwardly from the outer end thereof. This type of arm is assembled with the connector by inserting the arm inwardly with the lower surface of the arm resting on the upper abutments until the nub engages the end of the slot. Thereafter, the arm is pivoted relative to the connector to a position where the spring clips lock the arm in position.

Further objects and advantages of the present invention will be apparent from the following description, reference being had to the accompanying drawing, wherein a preferred embodiment of the present invention is clearly shown.

In the drawing:

Figure 1 is a fragmentary view in elevation of the connector of this invention attached to a wiper arm having a curved end.

Figure 2 is a top view of the blade-to-arm connector shown in Figure 1.

Figure 3 is a longitudinal sectional view taken along line 3—3 of Figure 2.

Figures 4 and 5 are sectional views taken along lines 4—4 and 5—5 of Figure 3.

Figure 6 is a bottom view of the blade-to-arm connection shown in Figure 1.

Figure 7 depicts the first step in attaching the curved end wiper arm to the connector.

Figure 8 is a fragmentary sectional view depicting the connector as used with a straight end arm.

With particular reference to Figure 1, a portion of a flexible wiper blade for cleaning a curved surface is shown including a rubber wiping element 10 which is carried by a flexible backing strip 11. Wiping pressure is imparted to the squeegee unit comprising the wiping element 10 and the flexible backing strip 11 through secondary pressure distributing members 12 and 13 which are connected at longitudinally spaced points to the flexible backing strip in a conventional manner. The secondary pressure distributing members 12 and 13 are pivotally connected at 14 and 15, respectively, to a primary pressure distributing member, or holder 16. The connector of this invention is depicted generally by the numeral 17, and is pivotally connected to the holder 16 by means of a pin 18.

With particular reference to Figures 2 through 6, the connector 17 comprises an inverted channel-shaped member having a top wall 19 and side walls 20 and 21. The top wall 19 has a slot 22 therein having ends 23 and 24. The side walls 20 and 21 have portions 26 and 27 bent inwardly therefrom in the medial portion of the slot 22 to form a pair of abutments, the upper surfaces of which are in a plane parallel to but spaced from the top wall 19 of the connector. In addition, the side walls 20 and 21 have a pair of folded over portions 28 and 29 which form a pair of abutments parallel to and spaced beneath the abutments 26 and 27. The lower abutments 28 and 29 present ends 30 and 31, the function of which will be described hereinafter.

The side walls 20 and 21 of the connector are also formed with slots which separate the main side wall portions of the connector from a pair of spring clips 32 and 33. The spring clips 32 and 33 are integral with the connector and as shown in Figure 5, are designed to engage the edges of a wiper arm 34. The wiper arm 34 may be of the type having a hooked end as shown in Figures 1 through 7, or of the type having a straight end as depicted by the numeral 34' in Figure 8.

The connector is specifically designed for use with a hooked end wiper arm, which as shown in Figures 3 and 7 has an end portion 35 located at right angles to the main portion of the arm and extending towards the surface to be cleaned. When the hooked end arm is attached to the connector as shown in Figures 1 through 6, the spring clips 32 and 33 engage the main portion of the arm 34 and a straight portion thereof overlies and engages the upper surfaces of abutments 26 and 27. The end 35 engages the edges 30 and 31 of the lower abutments 28 and 29, respectively. The side walls 20 and 21 of the connector snugly receive the curved end 35 of the wiper arm and in combination with the spring clips 32 and 33 and the abutments 26 and 27 preclude angular movement of the arm 34 relative to the connector 17. By reason of the fact that the curved end portion 35 engages the edges 30 and 31 of the abutments 28 and 29, the arm cannot be separated from the connector by forces acting outwardly along the longitudinal axis of the arm.

With particular reference to Figure 7, the manner in which the curved end arm is attached to the connector will be described. Initially, the blade assembly is inverted and the curved end 35 of the arm is inserted through the slot 22 between the end 23 and the abutments 26 and 27. Thereafter, the blade assembly is rotated about its longitudinal axis throughout 180° so that the curved end portion 35 of the arm will be disposed in the slot 22 between the end 24 of the slot and the abutments 26 and 27. To securely attach the wiper arm to the connector, the blade assembly is then rotated about an axis normal to the longitudinal axis of the arm so that the straight portion of the arm engages the upper surfaces of the abutments 26 and 27 and the end portion 35 engages the edges 30 and 31 of the abutments 28 and 29. The arm 34 is locked in position by the spring clips 32 and 33 which engage the edges thereof as shown in Figure 5.

With reference to Figure 8, the connector 17 can also be used with a straight end arm as indicated by numeral 34'. The straight end arm is formed with a raised nub 36 spaced inwardly from the outer end thereof. The nub 36 is designed to engage the end surface 23 of the slot 22 with the outer portion of the arm overlying the abutments 26 and 27. The spring clips 32 and 33 securely retain the arm 34' assembled with the connector. The straight end arm is assembled with the connector rotating the blade about an axis normal to the longitudinal axis of the arm and inserting the end of the arm 34' through the slot 22. Thereafter, the blade assembly is rotated in the opposite direction to engage the spring clips 32 and 33 with the edges of the arm 34'.

From the foregoing it is readily apparent that the present invention provides a quick detachable connector which can be used interchangeably with a hooked end arm or a straight end arm. Moreover, the connector is designed to prevent rotation, or twisting movement, of the arm relative to the connector irrespective of the type of arm employed.

While the embodiment of the invention as herein disclosed constitutes a preferred form, it is to be understood that other forms might be adopted, as may come within the scope of the claims which follow.

What is claimed is as follows:

1. A support, a connector carried by said support, said connector comprising an inverted channel member having an open end, said channel member having side walls and a top wall with a slot therein, a pair of inwardly extending longitudinally elongate abutments spaced from the top wall beneath said slot and lying in a plane substantially parallel to said top wall, and a pair of spring clips integral with the side walls, said abutments being arranged to engage and support a substantial portion of an entering part and said spring clips engaging said entering part to detachably secure said entering part therein and prevent twisting movement between the entering part and the connector.

2. A connector for establishing a detachable connection between a windshield wiper blade and a wiper arm, said connector comprising an inverted channel member having an open end, said channel member having a top wall and side walls, said top wall having a slot therein, a pair of inwardly extending longitudinally elongate abutments integral with the side walls and lying in a plane substantially parallel to and beneath said top wall, and resilient locking means integral with the side walls of said connector for retaining an entering part of the wiper arm, a substantial portion of the entering part of said wiper arm being confined between the upper surfaces of said pair of abutments and the inner surface of said top wall.

3. A support, a connector carried by said support comprising an inverted channel member having an open end, said channel member having a top wall with a slot therein and side walls, inwardly extending longitudinally elongate abutment means integral with said side walls and lying in a plane substantially parallel to and beneath said top wall, and a pair of spring clips integral with the side walls, said abutment means being arranged so that an entering part is confined between the upper surface of said abutment means and the inner surface of said top wall with the spring clips engaging the entering part whereby twisting movement between the entering part and the connector is prevented.

4. A connector for establishing a detachable connection between a windshield wiper blade and a wiper arm, said connector comprising an inverted channel member having an open end, said channel member having a top wall and side walls, said top wall having a slot therein, a first pair of inwardly extending abutments integral with the side walls and spaced beneath said top wall, a second pair of abutments spaced beneath said first pair of abutments and extending from the side walls, and resilient locking means integral with the side walls of said connector for retaining an entering part of the wiper arm, the entering part of said arm having a hooked end, a portion of the entering part engaging the upper surface of said first pair of abutments and the hooked end engaging the ends of said second pair of abutments.

5. A support, a connector pivotally attached to said support comprising an inverted channel member having an open end, said channel member having a top wall and side walls, said top wall having a slot therein, a first pair of inwardly extending abutments integral with the side walls and spaced beneath the slot in the top wall, a second pair of abutments integral with the side walls comprising inwardly folded over portions disposed beneath said first pair of abutments, and resilient locking means integral with the side walls of the connector for retaining an entering part, the entering part having a portion disposed between the upper surface of said first pair of abutments and the inner surface of said top wall so as to prevent twisting movement between the entering part and the connector, said entering part having a hooked end engageable with the ends of the second pair of abutments for preventing relative longitudinal movement between said entering part and said connector in one direction.

References Cited in the file of this patent

UNITED STATES PATENTS

| 2,122,802 | Rappl | July 5, 1938 |
| 2,153,225 | Zaiger | Apr. 4, 1939 |
| 2,807,822 | Scinta | Oct. 1, 1957 |

FOREIGN PATENTS

| 374,823 | Great Britain | Dec. 9, 1930 |